Aug. 5, 1969   F. FALKENBURG   3,459,113

BATTERY TESTING CIRCUIT FOR A SELF-BALANCING BRIDGE

Filed Feb. 17, 1966

INVENTOR
FRITZ FALKENBURG

BY Nolte and Nolte

ATTORNEYS

United States Patent Office 3,459,113
Patented Aug. 5, 1969

3,459,113
BATTERY TESTING CIRCUIT FOR A SELF-BALANCING BRIDGE
Fritz Falkenburg, Erlangen, Bavaria, Germany, assignor to P. Gossen & Co. G.m.b.H., Erlangen, Bavaria, Germany
Filed Feb. 17, 1966, Ser. No. 528,205
Claims priority, application Germany, Feb. 20, 1965, G 42,895; Mar. 6, 1965, G 43,019
Int. Cl. G03b 9/07
U.S. Cl. 95—64  8 Claims

ABSTRACT OF THE DISCLOSURE

A reference voltage is optionally applied to a fixed resistance branch of a self-balancing bridge and causes a constant deflection in the zero indicator of the bridge. The zero indicator has no directing torque so that the deflection depends on voltage condition of the balancing voltage source. The reference voltage may be supplied by an additional constant voltage source or derived directly from the bridge voltage source by the aid of a voltage sensitive element.

---

The subject invention relates generally to camera controls, and more particularly it relates to camera controls for photo or movie cameras in which it is desired to furnish indication of the level of the supply voltage.

There are known photo and movie cameras which employ a control circuit to automatically control the amount of light in the film plane, which control circuit consists of a resistance bridge circuit in one branch of which a photosensitive device is placed to receive light from the aperture of the camera, and the diagonal of which bridge circuit consists of a measuring device which is mechanically coupled to the aperture in such a manner that the photosensitive device is exposed to constant light intensities through the aperture. The measuring device is preferably a special electrical measuring instrument the rotatable part of which has practically no mechanical torque. The bridge circuit is supplied from a battery, the latter also supplying energizing current to other load devices present in the camera, such as a motor in movie cameras, etc.

In the known devices, however, there is no possibility to furnish indication of the energy level in the supply source by simply switching same into a bridge circuit for indication of its voltage by the measuring device in the diagonal of the bridge circuit as the measuring instrument has no mechanical torque.

In general, it is not necessary that the supply voltage remains at a certain constant level. It may vary between a certain maximum and a minimum level. It is desired, however, to keep it above the minimum level, since the current which the voltage supply would be able to deliver to the bridge circuit in the event it is below the minimum level, would not be sufficient to energize the bridge so that any unbalance of the bridge would result in sufficient differences which would be able to overcome the frictional resistances present in the mechanical couplings between the measuring device and the aperture. Neither would such low supply voltage be able to overcome the developing mechanical momentums. The control of the supply voltage becomes even more imperative in cases where the voltages supply energizes additional load devices, such as a driving motor for driving the reel of a movie camera, etc.

An attempt to provide a separate measuring device for monitoring the supply voltage would be economically unfeasible due to the additional costs of the measuring device. It has been proposed to provide signal lamps for indication of a predetermined level of the supply voltage. In other instances, to compensate the diminishing energy of a power supply, the measuring device has been provided with an additional spring bias which, beyond a certain meter deviation, aids the momemtnum developed in response to the supply voltage appearing in the bridge diagonal. The first mentioned arrangement, employing the indicator lamps, has its disadvantage in that the indicator lamp may come on at levels other than the desired minimum level, whereas in the second instance, the use of an additional biasing spring may involve difficulties in that the biasing spring may not be completely inactive and frictionless on its inactive range, which circumstance leads to untrue aperture values indicated by the measuring device.

It is, therefore, an object of the present invention to provide a camera having an improved electric supply source control therein.

It is another object of the invention to provide in a camera an improved supply voltage control circuit, in which the supply voltage level is reliably indicated by simply switching an auxiliary circuit into the circuit of the measuring device.

It is still another object of the invention to provide, in a camera, a supply voltage control circuit in which the control is affected by switching an additional voltage supply into the control circuit, such additional voltage supply developing a constant voltage across the control circuit, which constant voltage is indicative, when superimposed over that of the main supply voltage of the energy level in the main supply voltage.

It is still a further object of the invention to provide, in a camera, a supply voltage monitoring circuit in which additional circuit means provide a votlage drop in a control circuit, the additional circuit means developing such voltage drop from the main supply voltage of the camera alone.

With these objects in view, the invention provides in a camera operable with a light-sensitive film, aperture and shutter means for admitting light to the film when actuated, photosensitive means arranged in the path of light for sensing the intensity thereof, means connected in circuit-relationship with the photosensitive means for forming a circuit therewith, such circuit being adapted to be balanced under pre-determined light conditions, measuring means connected in circuit-relationship with the balanceable circuit for adjusting the aperture means in response to conditions in such circuit, means for supplying energizing potential to such circuit and means adapted to be selectively connected into the circuit for supplying an additional potential thereto, the arrangement being such that the additional potenital supply means, when selectively connected to the circuit, unbalances the circuit by a substantially constant amount, the amount being indicative of the energy level of the energizing potential supplying means.

In one embodiment of the invention the control circuit includes a bridge circuit in one of the arm circuits of which the photosensitive device is placed, and the diagonal of which includes the measuring device which indicates and controls the instantaneous aperture values, as well as the instantaneous battery voltage of the main supply source in accordance with the invention, the main supply battery being connected to the bridge at one diagonal thereof, whereas an additional supply source is connected to another diagonal of the bridge, preferably across the diagonal containing the measuring device. The additional supply source may be a battery of constant potential, which is connected to the last mentioned diagonal through a load resistor and a switch. In the event, however, when a non-constant supply voltage is available for the additional supply source, voltage stabilizing means, such as a Zener diode, in accordance with the invention, may be connected in circuit relationship with the additional supply voltage for stabilizing the voltage level thereof.

In another embodiment of the invention, the above described additional supply voltage is dispensed with, and instead of an additional supply voltage, a stabilizing circuit branch is used, which has the property of developing a constant voltage which is then selectively connected to a point, preferably to the diagonal in which the measuring device is disposed. More specifically, the main supply voltage is shunted by a circuit branch containing a resistor which has a constant resistance characteristic, and which is connected in series with a voltage stabilizing device, such as a Zener diode or a semiconductor rectifier, the resistance value of the shunt branch being such that the voltage taken off at the point between the resistor and the semiconductor device is constant irrespective of the energy level in the main supply voltage.

In another embodiment of the invention the above described stabilizing circuit branch is dispensed with, and instead a circuit branch is used containing a resistor of constant resistance characteristic which is in series connected with a second resistor the resistance characteristic of which is voltage dependent, such as a semiconductor diode used in its forward direction. This circuit branch is connected across the supply voltage. The point between the constant resistor and the voltage dependent resistor may be selectively connected by a switch to one pole of the measuring device in the bridge diagonal.

In accordance with the invention, the control network in a camera, where several load devices, such as a drive motor, are connected to the main supply battery energizes at the same time also the bridge network contained in the control circuit, the battery voltage control is effected through a resistor or a resistor network, the equivalent resistance of which is substantially equal to the equivalent resistance, i.e. the total current need of the load devices, such as the drive motor. When the above-mentioned resistor or resistance network is inserted into the circuit, the battery voltage drops due to the drain of such high current therefrom, which relative high drop particularly appears noticeable when the battery is close to the end of its lifetime. Therefore, a low battery is unable to supply sufficient current to the additional resistor or resistor network which fact leads to an insufficient energization, i.e. unbalancing of the bridge circuit, which may serve as an indication of the energy level of the battery.

It is also within the scope of the invention that the above-mentioned additional supply voltage may be inserted into the bridge circuit at any point, and the entire additional supply voltage circuit may be placed within any of the arm circuits of the bridge.

The invention will become more readily apparent from a description of preferred embodiments thereof shown in the accompanying drawing, in which.

Figure 1:
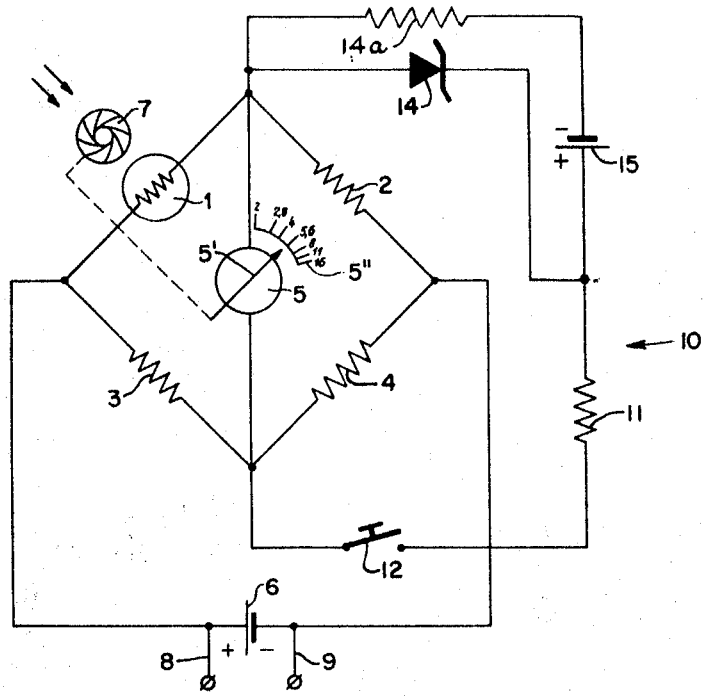
FIG. 1 is an equivalent circuit showing the supply voltage control in a camera, in accordance with the invention.

With reference to FIG. 1, the aperture and battery control circuit 10 comprises a bridge circuit in one arm of which a photosensitive device, such as a photoresistor 1 is disposed, whereas the remaining arms of the bridge circuit are made up from resistors 2, 3 and 4. The diagonal of the bridge circuit includes a special meter 5, the spirals of which are practically without any torque, which senses any unbalanced condition in the bridge circuit and with its pointer 5' is mechanically coupled to an aperture device 7 of the camera. Apterture device 7 and photoresistor 1 are correlated, i.e. aligned in such a manner that light incident to the aperture 7 will find photoresistor 1 in its path, whereby the photoresistor, due to its light sensitive characteristics, will effect the balancing and unbalancing of that bridge arm, thereby the entire bridge circuit.

The bridge circuit is supplied with energizing current from a main supply battery 6 which is connected to the other diagonal of the bridge circuit, whereas terminals 8 and 9 lead to other load devices of the camera, such as a drive motor in case of movie cameras.

In order to ascertain the energy level present in main supply battery 6, there must be some sort of means provided, which in accordance with the embodiment disclosed in FIG. 1 is an additional network connected to the diagonal of the bridge network containing the meter 5 through a switch 12 and including a supply battery 15 for selective connection, as an additional supply, into the bridge network. The supply battery 15, when connected to the bridge by switch 12, supplies a constant voltage to the bridge network and unbalances the bridge by a predetermined amount, which is constant. Preferably, the supply battery 15 is a mercury battery. The insertion of battery 15 into the bridge network causes same to be unbalanced, therefore, the meter 5 experiences a deflection balanced, therefore, the meter 5 experiences a deflection, whereupon its pointer 5' mechanically coupled to aperture device 7 will set the aperture to values which could be considered as abnormal under prevailing light conditions. These conditions, namely the insertion of the battery into the bridge network for control purposes takes place only at selected instances and does not effect the quality of the picture, because it is preferably done before or after the taking of the picture.

The constant amount of differential bridge unbalance resulting in a constant differential deflection of the pointer 5', when combined with the varying main supply voltage energizing the bridge, indicates the energy level present in the main supply battery 6. As mentioned above, the main supply battery energizes the bridge circuit which energization level may or may not be sufficient to cause to overcome the mechanical friction and the momentums present in the apparatus in case of low energy levels in the supply battery. This circumstance is used for deriving therefrom information as to the energy level in the main battery, by inserting a constant potenutial into the bridge circuit to unbalance same, whereupon the pointer 5' either deflects by a constant amount to very low values of the scale 5" in case the additional supply battery 15 is arranged in bucking relation to the energizing effect of the main supply battery 6, or deflects by a constant amount to higher values should the constant additional supply voltage be arranged in aiding relationship with respect to the main supply battery 6. In any instance, insertion of the additional supply voltage causes a differential current to flow through the diagonal which differential current is the algebraic sum of the energies flowing through the diagonal due to the two batteries at that instant and which deflects the pointer 5' through values which in their magnitude on the scale 5" indicate the energy level in the main supply. To this effect, the scale 5" which is associated with the pointer 5' may be graduated with numbers of a different color indicative of the energy level on a desired range in the main battery, or simply provided with a red mark placed at a certain scale value. Deflection of the pointer 5' below or above such red mark should be indicative of the critical conditions of the energy level in the main battery 6. In the event a nonconstant additional voltage supply is available instead of a preferred constant mercury battery 15, or a battery might be present which does not supply a constant voltage due to its aging, then the voltage of the additional supply circuit is desirable to be stabilized at a certain constant level by less expensive circuit elements, such as a Zener diode 14 connected through load resistor 14a in parallel with battery 15, which diode, as well known in the art, has the characteristics of a constant voltage generator, therefore, the point at which the Zener diode is connected to the diagonal, will be kept at a constant potential.

Figure 2:
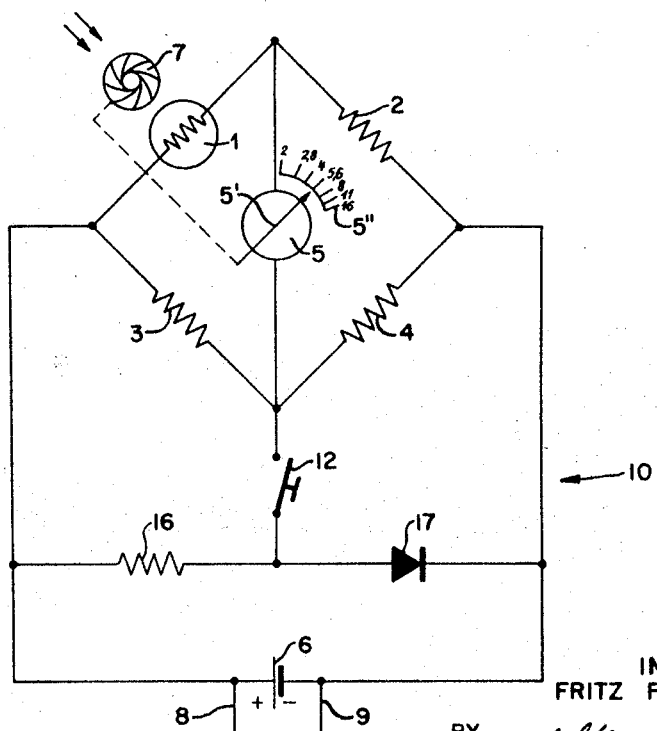
FIG. 2 is another embodiment of the invention.

With reference to FIG. 2 of the drawing which represents another embodiment of the invention, and in which like elements of the bridge circuit are identified by the same reference characters as those used in connection with the embodiment shown in FIG. 1. In this embodiment, however, instead of employing an independent additional supply battery like that of FIG. 1, a circuit consisting of a constant resistor 16 in series with a voltage dependent resistor 17 such as a semiconductor diode used preferably in its forward direction connected across the main battery 6, is employed. The point between the resistor 16 and diode 17 is connected by a switch 12 to the diagonal of the bridge containing the meter 5. Switching the branch circuit containing resistor 16 and diode 17 into the diagonal of the bridge containing meter 5 will have the following effect upon the conditions of balance of the bridge: The diode 17 used as a resistor with voltage dependent resistance characteristic shunts the bridge resistor 4 the more, the lower the internal resistance of diode 17 is. This resistance is the lower, however, the higher the voltage across diode 17 is which depends directly on the voltage of supply battery 6. The more the resistor 4 is shunted by diode 17 the more is the unbalance of the bridge circuit and the more the meter 5 will change its pointer deflection 5' on scale 5''. The value of resistor 16 and the value of the forward resistance of diode 17 are chosen such that the constant voltage to be inserted into the diagonal of the bridge results always in a maximum unbalance of the bridge due to such insertion. This is necessary more so that even slight variations in the main supply battery could be detected by a maximum deflection. Under some conditions it may be useful to dispense of the resistor 16 and to switch voltage dependent resistor 17 just parallel to bridge resistor 4.

In case of some movie cameras, it might be desirable to provide instead of the additional supply network, a resistance network insertable in circuit with the main supply battery 6 and at any of the diagonals of the bridge network, which resistance network has the characteristics of drawing substantially the same amount of current from the main battery 6 as that of the drive motor of the movie camera when in operation. When such additional network is inserted into the bridge circuit, the balancing of the bridge is upset by a differential amount corresponding to a current value which is equivalent to conditions when the drive motor is in the circuit. Therefore, under conditions when the drive motor is out of the circuit, it becomes possible by the insertion of such equivalent resistance value to monitor operating conditions, i.e. conditions showing the energy level in main supply battery during operation of the movie camera. The deflection of the pointer of the meter under such conditions, similarly to the principles explained above, is again indicative of the actual energy level of the main supply battery 6 during operational conditions.

It is seen that the invention provides a simple and inexpensive manner of ascertaining the energy level in the main supply battery of a camera, simply by switching an additional supply voltage to unbalance the energizing conditions existing in a bridge network due alone to the instantaneous energizing capability of a main supply battery. Such additional energizing potential may monitor also actual opearting conditions in the camera as has been pointed out in connection with the embodiment employing a resistance equivalent to the current drawing capability of the motor.

Although the invention has been described with reference to specific embodiments, it is not intended that it should be limited to such specific embodiments alone, but it should be interpreted and defined by the scope of the appended claims.

What is claimed is:

1. In an automatic exposure control for a camera, the combination comprising aperture and shutter means for admitting light into said camera when actuated, photosensitive means arranged in the path of light for sensing the intensity thereof, means connected in circuit relationships with said photosensitive means for forming a bridge circuit therewith, said bridge circuit being adapted to be balanced under predetermined light conditions, measuring means having a mechanically undirected indicator means and two electrical terminals, said measuring means being electrically connected in diagonal circuit relationship with said balanceable bridge circuit and mechanically coupled with said shutter means for adjusting said aperture means in response to conditions in said photosensitive means, means for supplying energizing potential to said bridge circuit and means adapted to be selectively connected into said circuit for supplying an additional reference potential thereto, the arrangement being such that said additional potential supplying means, when selectively connected to said bridge circuit, unbalances said circuit by a substantially constant amount, said amount being indicative of the energy level of said energizing potential supplying means.

2. The combination as claimed in claim 1, wherein said additional potential supplying means comprises a source of constant potential connected in circuit relationship with said measuring means for applying a constant potential thereto.

3. The combination as claimed in claim 1, wherein said measuring means is a deivce having a pointer and a scale associated therewith, said pointer being coupled to means for controlling said aperture means.

4. The combination as claimed in claim 1, wherein said additional potential supplying means comprises potential sensitive resistor means and an ohmic resistor means forming a voltage divider therewith, said voltage divider being connected across said energizing potential supplying means, further comprising switch means for selectively connecting the junction point of said voltage divided to a terminal of said measuring means.

5. The combination as claimed in claim 4, wherein said potential sensitive resistor means is a unidirectional deivce.

6. The combination as claimed in claim 1, including potential regulating means connected in circuit relationship with said additional potential supplying means.

7. The combination as claimed in claim 6, wherein said potential regulating means comprises a Zener diode.

8. In a bridge circuit comprising a power source, a measuring means having a movable pointer means mechanically coupled with a variable resistance branch of said bridge circuit for being automatically adjusted into a balanced position, a combination for testing voltage condition of said power source comprising a reference voltage member electrically connected through a switch across a fixed resistance branch of said bridge circuit for deflecting said pointer means from said balanced position by an amount indicating the voltage level at said power source.

References Cited

UNITED STATES PATENTS

| 3,124,033 | 3/1964 | Freudenschuss | 352—141 |
| 3,224,350 | 12/1965 | Stimson | 95—10 |
| 3,227,056 | 1/1966 | Lieser | 95—10 |

OTHER REFERENCES

Jacob, German application 1,144,107, printed Feb. 21, 1963.

NORTON ANSHER, Primary Examiner

JOSEPH F. PETERS, Jr., Assistant Examiner

U.S. Cl. X.R.

95—210; 250—210; 324—98; 352—141